SILO BOTTOM UNLOADER SYSTEM

Filed July 25, 1966 5 Sheets-Sheet 1

INVENTORS
RICHARD L. WEAVER
BENJAMIN K. SMOKER

BY Wynne and Finken
ATTORNEYS

INVENTORS
RICHARD L. WEAVER
BY BENJAMIN K. SMOKER
Wynne and Finken
ATTORNEYS

SILO BOTTOM UNLOADER SYSTEM

Filed July 25, 1966 5 Sheets-Sheet 3

INVENTORS
RICHARD L. WEAVER
BENJAMIN K. SMOKER
BY Wynne and Finken
ATTORNEYS

SILO BOTTOM UNLOADER SYSTEM

Filed July 25, 1966 5 Sheets-Sheet 4

INVENTORS
RICHARD L. WEAVER
BENJAMIN K. SMOKER
BY Wynne and Finken
ATTORNEYS

SILO BOTTOM UNLOADER SYSTEM

Filed July 25, 1966 5 Sheets-Sheet 5

INVENTORS
RICHARD L. WEAVER
BENJAMIN K. SMOKER

BY Wynne and Finken
ATTORNEYS

United States Patent Office 3,391,809
Patented July 9, 1968

3,391,809
SILO BOTTOM UNLOADER SYSTEM

Richard L. Weaver, Rte. 1, and Benjamin K. Smoker, Rte. 3, both of Myerstown, Pa. 17067
Filed July 25, 1966, Ser. No. 567,722
10 Claims. (Cl. 214—17)

ABSTRACT OF THE DISCLOSURE

A silo bottom unloader system including a combination of a bottom unloader and a silage conditioning means which function together to facilitate silage removal. The auger means includes a runner at its outer end which cuts silage in a U-channel circular track and cooperates with blades on the auger positioned within the U-channel to keep the U-channel free for easy movement therethrough. The sweep movement is accomplished by a tapered drive wheel with conical teeth which continuously extrudes silage from the U-channel. An arcuate guard next to the runner prevents freezing of the auger. A low profile arm behind the auger provides a safety valve. The auger has blades with angularly directed tips which undercut the silage to cause its descent.

This invention relates to a silo bottom unloader system.

Tremendous forces are encountered in the handling of a mass of silage. A large silo 24 feet in diameter and 70 feet high filled with silage having a moisture content of 70 percent contains about 950 tons of material. Silage of different materials and moisture content produce varying problems in the design of silo unloaders. Considerable attention has been given to the unloading of silos from the top since many engineering problems inherent in the tremendous forces at the bottom of the silo are thereby avoided.

The development of bottom unloaders for silos has been in the direction of accepting the tremendous forces encountered as an unavoidable problem to be overcome by high powered, heavy equipment. With the advance in silo technology, bigger silos are becoming wise investments and the problems of bottom unloading have become more severe.

The combination of the instant silo bottom unloader system includes silage conditioning means for loosening the silage and means for conveying the conditioned silage out of the silo. The silage conditioning means of the system includes, in part, constricting means for causing a horizontal compression and fracture of the bottom portion of the silage mass whereby the silage fibers separate and expand downwardly in a ballooning fashion. (This ballooning action is discussed in the Singley Patent No. 2,989,946.) Column forming means causes the formation of an annular column of silage at the bottom periphery of the mass which supports some of the weight of the descending mass and relieves the auger means at its critical outer end.

When silage fracturing arms are used, the resultant annular column of silage assumes the form of an arcade having arches of dense silage formed at each silage fracturing arm with the arm assuming the position of a keystone of the arch and with less dense silage assuming a position within each arch beneath each arm. Such an annular column will have an undulating densification pattern with alternating dense and less dense silage portions. Of course, with certain silages there will be rather sharp demarcation of the arch whereas in others a band of intermediate densified silage will exist. The interior or main mass of the ballooned silage may in some instances initially assume the form of a ceiling or dome which will collapse due to the action of the descending silage mass and/or the bottom unloader.

The constricting means may also include mounds extending inwardly from the silo wall; in a concrete silo these mounds can be formed as an integral part of the wall.

The conditioned silage is conducted by an auger means to an opening for gravity flow to a discharge conveyor which conveys the silage out of the silo. The auger means includes a cutter means or leading knife and auger combination at its outer end which effectively cuts and conveys silage out of the U-channel in which the auger means rides, thereby reducing the load. Further, the auger means includes a trailing arm having a bottom surface relieved toward its trailing edge to facilitate movement; this feature is particularly important when the sweeping movement is started as the reduced load effected by this design is significant. A further reduction of load on starting as well as during sweeping is obtained through the low profile guide plate which with the auger conducts silage to the opening. The top portion of the guide plate is a vertical member which terminates below the top of the auger thereby facilitating a safety-valve like overflow when the unit is operating at full capacity. The opening is formed as a radial slot in the rotatable central support to control the flow to the discharge conveyor. All silage is engaged by the auger at the center to prevent the buildup of a center pillar of silage which can destroy the unit. Hydraulic power is preferably employed with an automatic control means which slows and shuts off the outer sweep motor when the power required by the inner centrally located auger rotating motor system reaches a predetermined level. As the auger means sweeps around the silo, the mass of silage immediately behind the auger means may define an unfilled zone extending 2 to 6 feet. This zone, of course, soon becomes filled as the mass fractures and descends. The auger may, at times, become overloaded and the system of this invention responds to this overload condition by slowing or stopping the advancing or sweeping movement while allowing the auger to continue its clearing rotation.

These and further objects and advantages of the present invention will become more apparent upon reference to the following specification, appended claims and drawings wherein:

Figures 1, 2, 3, 4:
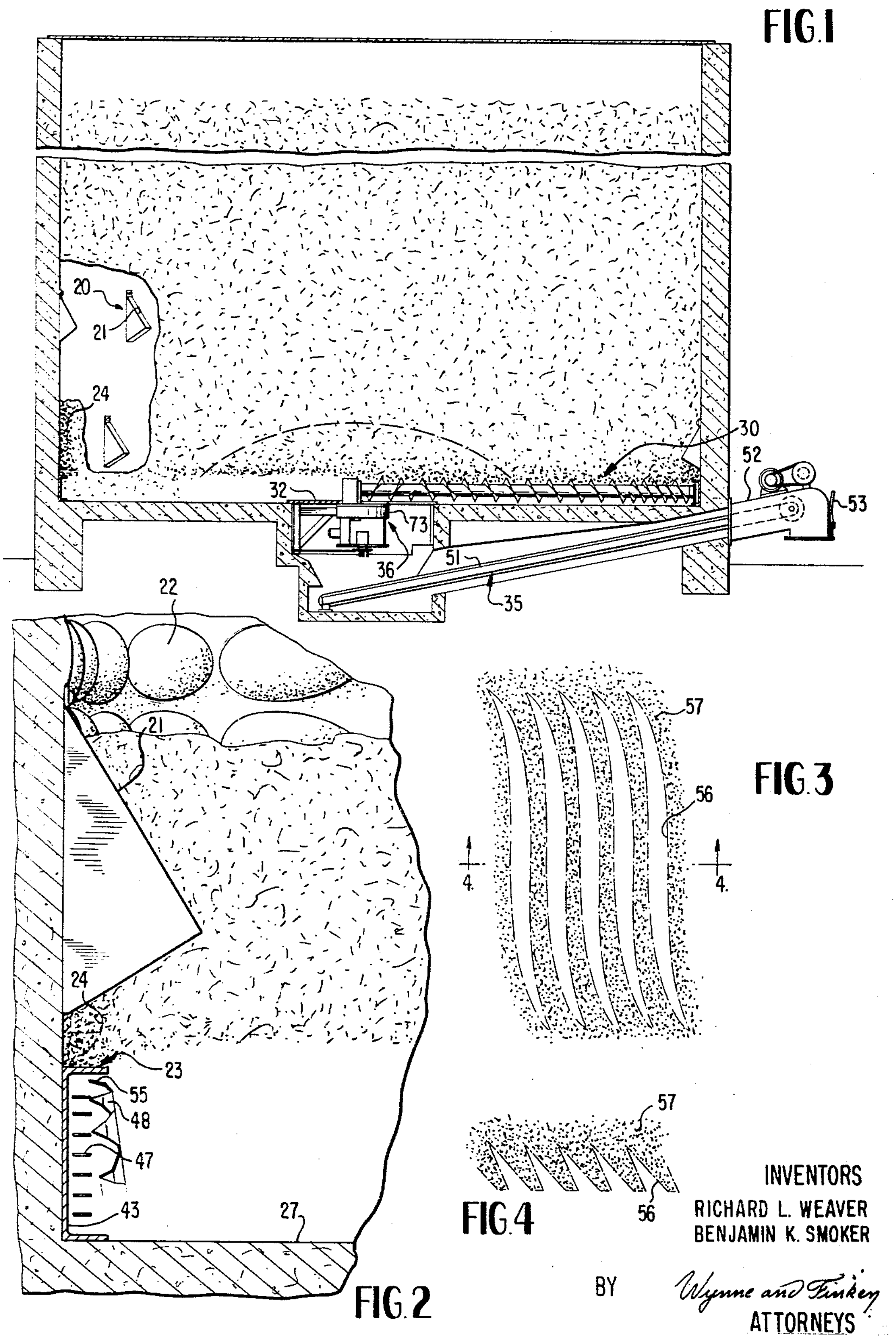
FIG. 1 is a side view in section of the silo unloader system.
FIG. 2 is an enlarged view of a portion of the silage conditioning means and auger means.
FIG. 3 is a view looking upwardly into the silage mass showing the cutting pattern of the auger and its teeth.
FIG. 4 is a view taken on line 4—4 of FIG. 3.

In a preferred embodiment, which would provide a system adapted for handling substantially all types of silage under all conditions, the system comprises a silage conditioning means 20 which includes the spaced silage fracturing arms 21 and an interior wall structure particularly at the lower portion of the silo which would have about 50 percent of its surface formed by mounds 22 extending inwardly about ½ to 1 inch, each mound 22 having a surface area of about 18 square inches (the mounds being about 3 inches high and 6 inches long). Since the outer end portion of the auger means 30 is exposed to tremendous forces, an annular column forming means 23 is provided around the outer edge of the bottom of the silo to cause the silage to form an annular column 24 which relieves the forces at the outer annular zone.

Figures 7, 8, 9, 10:
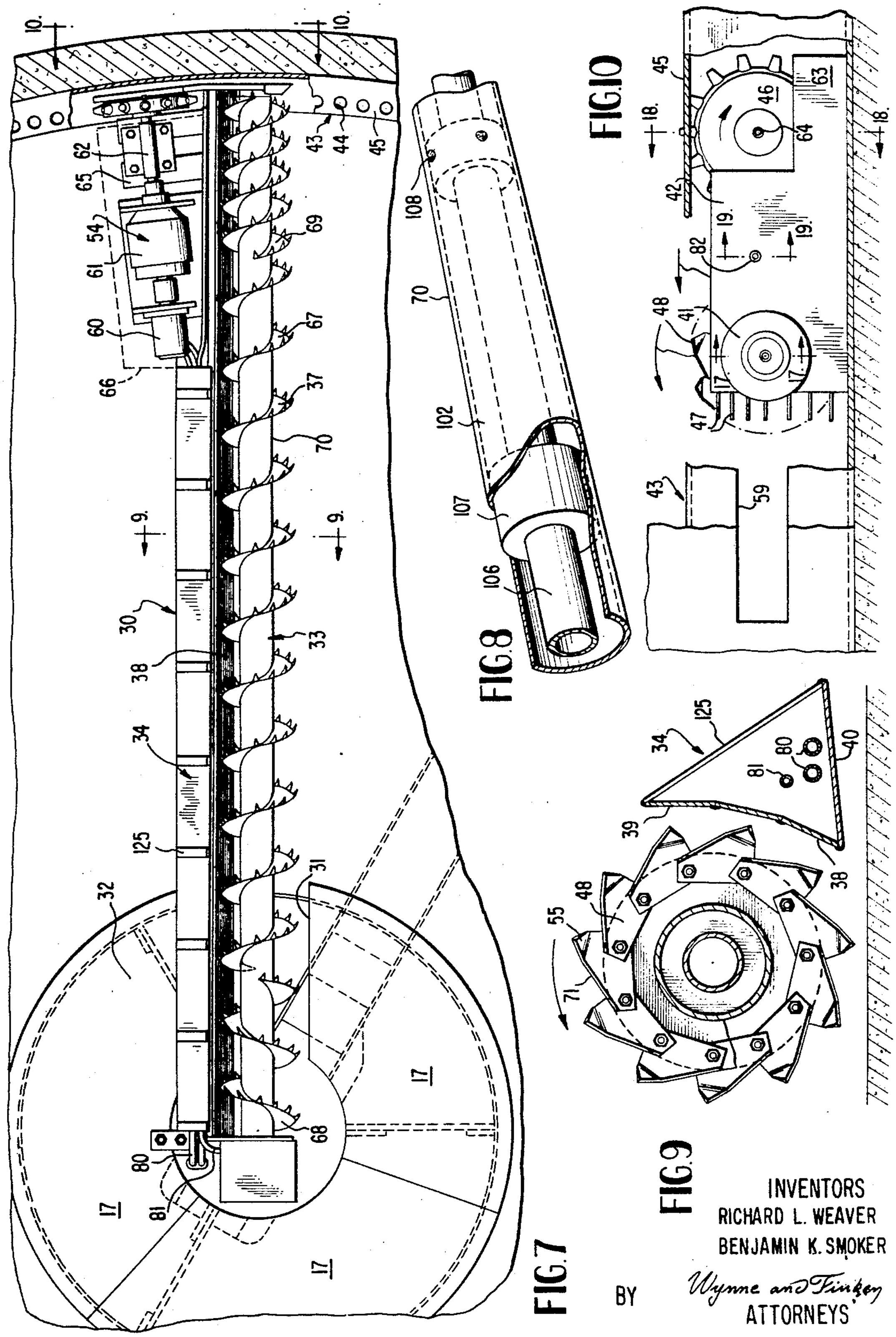
FIG. 7 is a top view of the auger means.
FIG. 8 is a perspective view with parts cut away of a portion of a shaft for the auger.
FIG. 9 is a view taken on line 9—9 of FIG. 7.
FIG. 10 is a view taken on line 10—10 of FIG. 7 with parts cut away for clarity.

The silage manipulated by the silage conditioning means is conveyed inwardly to an opening 31 by the auger means which includes a leading radial auger 33 and a trailing radial member of arm 34. The inner end of the auger extends to and may extend beyond the sweeping axis of the auger. Without such a design, a central pillar of silage develops which under certain circumstances can crush and destroy the auger means. A discharge conveyor 35 receives the silage as it falls through the opening 31, carries the silage to a point outside of the silo through a closed system to prevent the influx of air, and accomplishes a recirculation of the low oxygen air in the bottom of the silo. The opening 31 is formed as a radial slot in the top plate 32 of a rotatable central support 36 and is positioned immediately below the inner end of the auger 33, thereby restricting and controlling silage movement to the discharge conveyor. The auger 33 includes a main outer flight 37 which moves the silage beneath it and into engagement with a guide plate 38 which directs further silage movement toward the opening 31, the guide plate 38 being in substantially the form of a quarter circle with an upper vertical extension 39 terminating below the top of the auger. The arm 34 has a bottom surface 40 which extends upwardly toward its trailing portion to facilitate movement and particularly to reduce the power needed to start the sweeping action. The guide plate is provided with the low profile vertical upper portion 39 to enable the overflow of silage, thereby providing a release or safety valve type action. The outer end of the auger is rotatably mounted in the runner 42 through bearing 41. The runner 42 is arcuately formed to conform with the circular U-channel or track 43. The U-channel 43 has holes 44 in its top leg 45 which are engaged by a self-clearing cone-like or tapered toothed and tapered bodied drive wheel 46. The leading portion of the runner 42 is equipped with a cutter means including horizontally extending knives 47 which cut and shred silage within the U-channel. The auger is equipped with outwardly extending teeth 48 connected to the flights at positions which produce a tapered profile with the smallest end of the taper being positioned within the U-channel to allow the auger and its teeth 48 to cooperate with the knives 47 in maintaining a usable passageway for the runner (FIGS. 2 and 7). This construction avoids the buildup of a dense silage wedge ahead of the runner 42 which can overload and stop the sweep of the auger means. Non-cutting devices can produce such dense silage wedges; the cutting action of the knives and auger eliminates this problem. At the juncture between the guide plate 38 and the runner 42, an arcuate corner shield 49 (FIG. 20) is provided which prevents a buildup of dense silage at this critical point. The guide plate 38 is spaced from the auger to define a tapered space which is larger at the inner than at the outer end to provide an increased capacity for handling the increased volume at the inner end.

Figure 5:
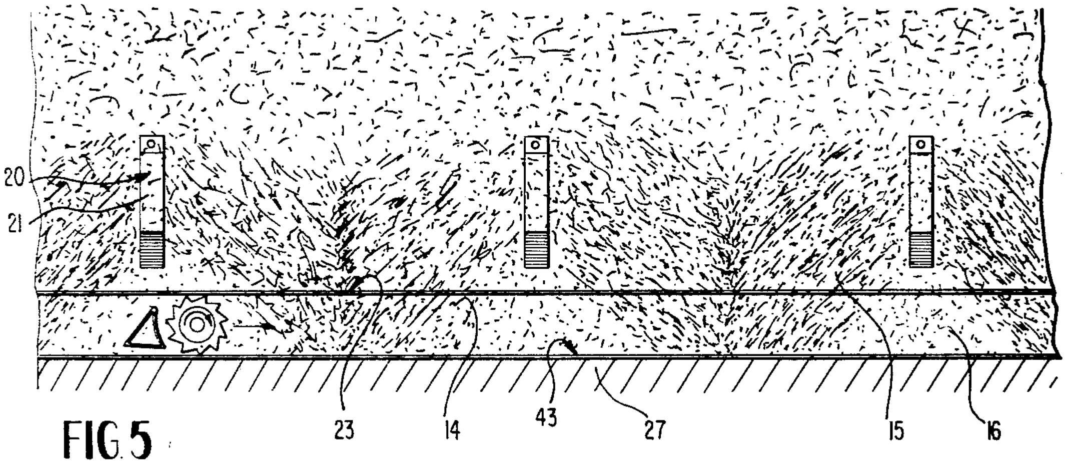
FIG. 5 is a schematic-type view showing the varying densification pattern of the silage in the outer annular portion of the silo whereby a formation similar to an arcade is developed for engagement by the auger means.

Considering the system in more detail, it will be seen that the silage mass is horizontally compressed by the smooth arms 21 located close to the silo floor 27, resulting with some silages in the development of a clearly defined annular arcade 14 (FIG. 5) having arches 15 of dense silage with each arm 21 acting as a keystone for its arch, less dense silage portions 16 forming within each arch.

The right triangular arms 21 are bolted to the internal wall of the silo by smooth rounded bolts which prevent silage buildup and jamming. A plurality of vertically spaced horizontal annular rows of arms 21 can be employed. For example, a 16 foot diameter silo will satisfactorily operate with one row of twelve arms positioned about 8 inches above the track 43, while a 20 foot diameter silo of a similar height of about 60 feet will work best with two rows of rams, with sixteen arms in each row, the second row being 4 to 6 feet above the previously described first row. A 24 foot diameter silo will require two rows similar to that of the 20 foot diameter silo but with eighteen arms for each annular row. For heights of about 70 feet, a third row 18 or 20 feet above the floor will be employed.

An important requirement is the maintenance of a smooth flow pattern for the descending mass of silage to and through the fracturing, somewhat knife-like, interruptions caused by the narrow 3 inch wide arms 21 which project inwardly of the silo wall a distance of about 8 inches.

The auger means 30 includes a rotatable central support 36 having pie-shaped outer segments 17 covering the discharge passageway 50 in the floor 27 and defining the restricted radial opening 31 beneath the auger 33, thereby preventing silage from clogging the passageway 50 and insuring control over the discharge rate.

The silage falls through the restricted opening 31 onto an upwardly inclined belt conveyor 51 for discharge through the enclosed and valved discharge chute 52, the valve being indicated in FIG. 1 by numeral 53.

The sweep means 54 (FIGS. 7 and 18) of the auger means 30 includes the drive wheel 46 with its central body tapered and cone-like teeth 48 which clear the drive holes 44 in the top leg of the track 43. The top surface of the top leg provides the annular column forming means 23. A separate angle bracket (not shown) may also be used to form the column forming ledge 23 which preferably has a width of about 2 to 3 inches. As shown, the preferred ledge 23 is formed by the U-channel which is connected to the outer bottom wall of the silo with the lower leg serving as a support for the runner 42 of the auger means 30.

The auger 33 (FIG. 9) is equipped with specially designed blades or teeth 48, each having an outer tip 55 which extends angularly away from and toward the outer end of the auger. These tips 55, as seen in FIGS. 3 and 4, are arranged to produce cuts 56 in the ceiling 57 of the silage mass with the deepest part of each cut overlapping the shallow part of an adjacent cut positioned radially outwardly therefrom. In this manner, the ceiling 57 of silage is undercut in an annular fashion to destroy any dome-like structure which may form and allow downward silage movement. Some silages will tend to form domes and when undercut in this fashion, collapse to the floor; in other silages, a progressive falling of the undercut portions occurs.

Figures 14, 15, 16, 17, 18, 19, 20:
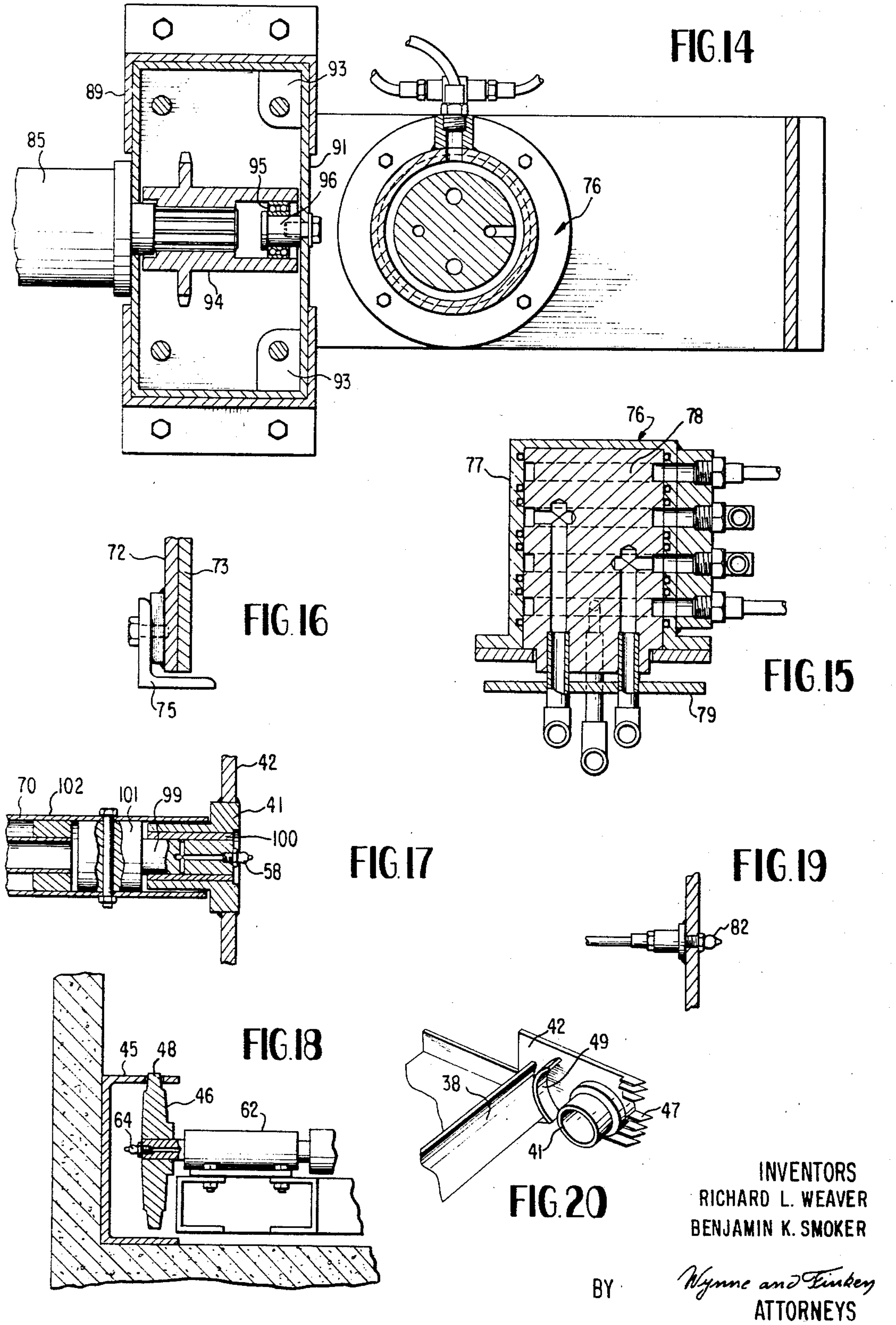
FIG. 14 is a view taken on line 14—14 of FIG. 11.
FIG. 15 is a view taken on line 15—15 of FIG. 11.
FIG. 16 is a view taken on line 16—16 of FIG. 11.
FIG. 17 is a view taken on line 17—17 of FIG. 10 showing the outer end bearing of the auger.
FIG. 18 is a view taken on line 18—18 of FIG. 10 showing a portion of the sweep means which drives the auger means around the silo.
FIG. 19 is a view taken on line 19—19 of FIG. 10 showing the lubrication fitting for the chain drive systems.
FIG. 20 is a per spective view showing the corner shield.

The auger 33 is mounted in bearing 41 in the curved runner 42 and, as seen in FIGS. 10 and 17, lubrication for the bearing 41 at the outermost end of the auger can be easily accomplished through an access door (not shown) in the silo through lube fitting 58. A suitable slot 59 is provided in the track 43 for access to the lube fitting.

Sweep means 54 is mounted radially inwardly of the U-channel and includes a hydraulic motor 60 (FIG. 7), a reduction gear assembly 61, bearing 62 and the drive wheel 46 having self clearing tapered conical teeth 48 as seen in FIG. 18 extending outwardly from the tapered main body portion. The preferred conical design accomplishes continual clearing of the holes 44 of compacted silage and the tapered shape of the main body portion enables the extrusion of silage caught between the main body portion 46 and the undersurface of the top leg of the track. It will be noted in FIG. 7 that the sweep means 54 is radially oriented and not parallel to the radially oriented auger 33. The runner 42 has a bottom rearward extension 63 positioned below the center line of the wheel 46; this extension 63 acts as a brace against tipping forces on the runner. A suitable lube fitting 64 for the sweep bearing 62 is provided as seen in FIG. 18.

The sweep means 54 is adjustably mounted on a framework 65 of auger arm 34. Arm 34 is welded or otherwise connected at one end to the runner 42 and extends radially inwardly and is connected at its inner end to the rotatable central support 36. The sweep means 54 is provided with a cover or housing 66, as indicated in dotted lines in FIG. 7, to protect it from silage.

The auger 33, as seen in FIG. 7, includes a main spiral rib or flight 67 which extends inwardly from the runner 42 to the support 36 with an auxiliary reverse spiral rib 68 extending from the center of the central support 36 outwardly to the main spiral rib, this auxiliary rib 68 serving to clear the top of the rotatable central support 36. It will be noted that the two ribs or flights meet each other at a point about midway along the length of the radial slot 31. At the outer end of the auger 33, a second auxiliary spiral rib 69 is added to the auger shaft 70 to aid the main spiral rib 67 in clearing the critical outer annular zone of the silo. Preferably the auxiliary rib 69 extends about 2 to 4 feet from the outer end of the auger shaft 70 for augers having lengths of about 12 to 20 feet.

Because some silages tend to become further compacted rather than displaced by a smooth edge auger, teeth or blades 48 have been added to the ribs to aid in the silage movement. While teeth of normal design sometimes improve the operation, certain types of silage still present difficult problems of removal. Teeth 48 which are bolted in overlapped interlocked relation (FIG. 9) to the ribs are of a unique design which results in an angular cutting away from the dome or downwardly facing surface of the silage. The teeth are angled from the plane of the auger ribs to undercut and break away chunks of silage from its connection with the main body of silage. The teeth are curved for face-to-face attachment to the ribs, as shown in FIG. 9, and each tooth has a long forward cutting edge 71, the outermost end or one third of the length and point thereof being bent toward the outer end of the auger. The teeth used at the outer end of the auger are preferably tipped with carbide material for longer life. As seen in FIG. 2, the outwardly inclined triangular tip on the teeth overhangs and clears the silage above the auger bearing 41 and within track 43.

Figure 11:
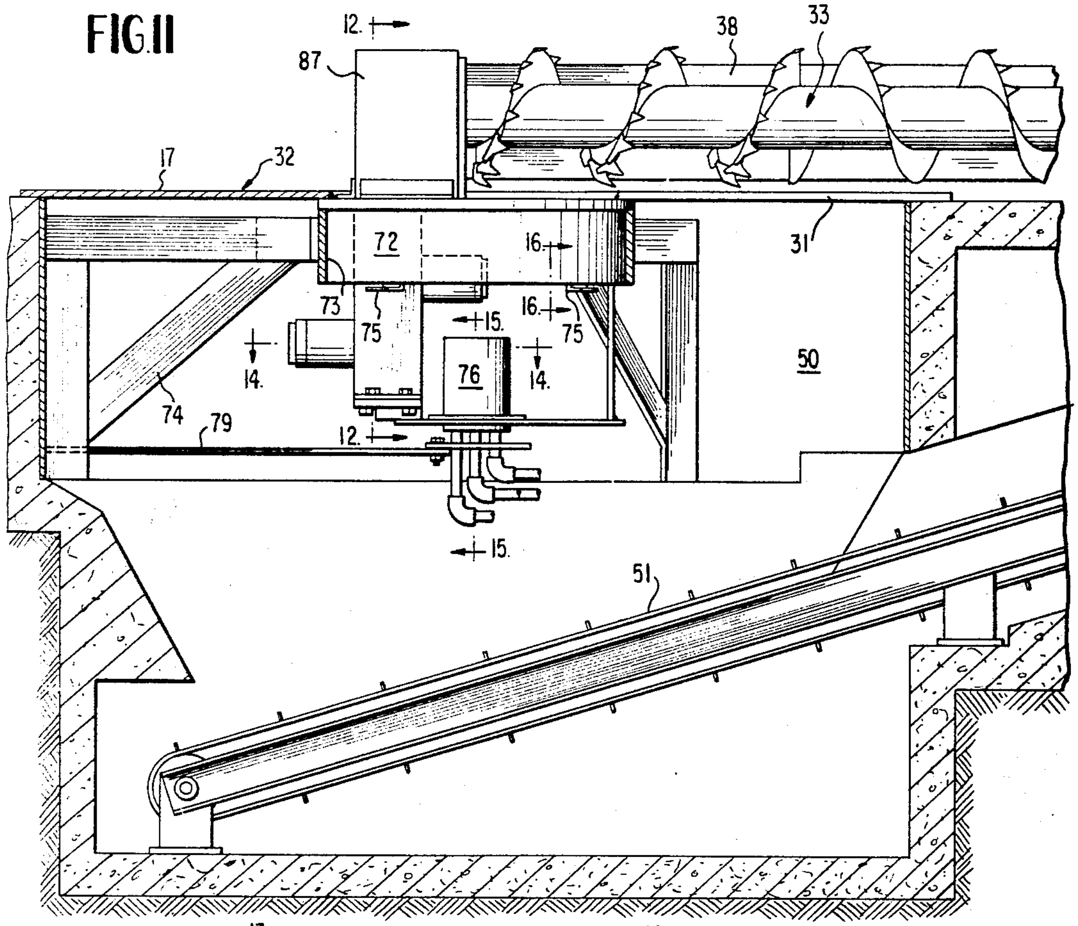
FIG. 11 is an enlarged view of the central opening area in the floor of the silo.

The inner end of the auger 33 is rotatably mounted on the central support 36 which includes a horizontal top plate 17 and depending annular skirt 72; the top plate 17 rests on the top edge of an annular bearing 73 (FIG. 11) with the skirt 72 rotatably received within the bearing. Suitable support framework 74 connects the annular bearing 73 to the concrete silo. Lock angles 75 are bolted to the bottom of the skirt 72 and project under the lower edge of the bearing 73 to prevent upward movement of the sweeping auger means (FIG. 16).

A hydraulic swivel 76 (FIGS. 14–15) is mounted with its annular outer portion 77 connected to the rotating central support 36 and its inner non-rotating portion 78 connected through bracket arm 79 to the framework 74 to prevent its rotation.

The hydraulic supply lines 80 for the sweep unit hydraulic motor 60 are housed within the auger arm 34 along with a lubricating conduit 81 which extends from the lube fitting 82 to the drive chains 83 and 84 which are located at the central support 36 for interconnecting the auger 33 with two hydraulic motors 85, 86 (FIGS. 11–14). The central support 36 includes an off center top housing 87 which encloses the chain drive and, except for the skeleton-like framework 74, a substantially clear discharge passageway 50 is provided for silage passage by gravity flow from the floor of the silo onto a flat conveyor belt which carries the silage upwardly out of the silo.

Figure 12:
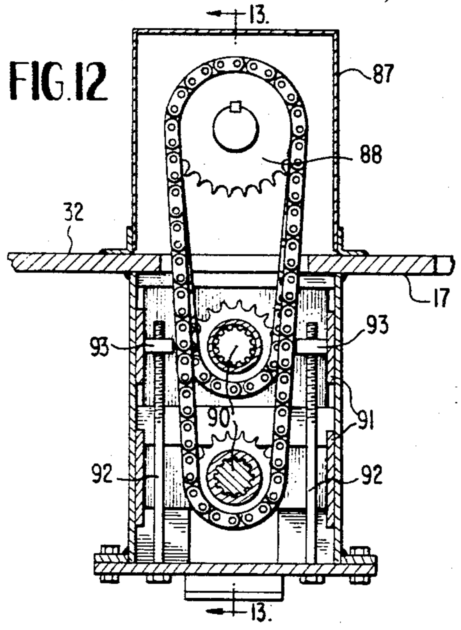
FIG. 12 is a view taken on line 12—12 of FIG. 11 showing the system for rotating the auger.
Figure 13:
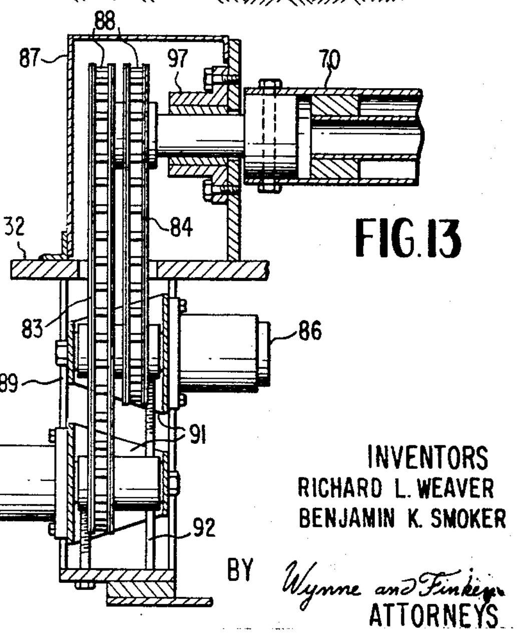
FIG. 13 is a view taken on line 13—13 of FIG. 12.

The means for rotating the auger 33 about its own axis preferably comprises the two fluid motors connected through their respective chains to driven sprockets 88, 88 on the auger shaft 70. The tension on the chains is adjustable. FIGS. 12–14 show the motors mounted on and extending outwardly from opposite open sides of a vertical hollow column 89 which depends from the top plate 32. The shaft and drive sprocket 90 of each motor are mounted within a rectangular frame 91 which in turn is mounted for vertical adjustment within the column 89. Preferably, the side panels of the frames 91 are tapered in a complementary mating fashion, as shown, to facilitate close placement of the frames if required for chain adjustment. Each frame 91 has two adjusting hold-down bolts 92 extending through the bottom member of the column 89 and threadedly engaged with corner lugs 93 in the frame. These bolts 92 enable vertical adjustment.

FIG. 14 shows the splined shaft (may be keyed) of the hydraulic motor 85 engaged by the interlocking keyed sprocket hub 94, the other end of the hub having a hole therein for receipt of a ball bearing 95 mounted on a pin 96 extending from the frame 91.

The bearing 97 for the inner end of the auger 33, shown in FIG. 13, is bolted to a vertical plate of the housing 87.

As seen in FIG. 17, the outer end member 99 of the auger shaft 70 is housed in a tubular bearing with liner 100 welded into a hole in the runner 42. The end member 99 has an enlarged inner portion 101 bolted to the outer tube 102 of the shaft, the tube 102 extending outwardly over the bearing 41 for the housing thereof.

The auger shaft 70, as seen in FIG. 8, may be made up of an inner tube 106 and the outer tube 102 connected by spaced annular solid rings 107. Each ring 107 is first welded to the inner tube 106 and then the outer tube is slid over the assembly and connected to the rings 107 by welding at locations about 2 feet apart defined by holes 108 formed in the outer tube. With this construction, the required strength is made available at a significant reduction in cost and weight of a shaft of similar capabilities made of solid stock or tubular stock. The outer profile of the auger is preferably tapered to a smaller periphery from the inner to the outer end to relieve the forces at the outer end, this taper being equivalent to a 1 inch reduction in diameter over a 12 foot length and being provided by a proper placement of the holes for bolting the teeth 48. This feature is not visible on the drawing; however, in practice it has proved of importance to improved operation.

Figure 6:
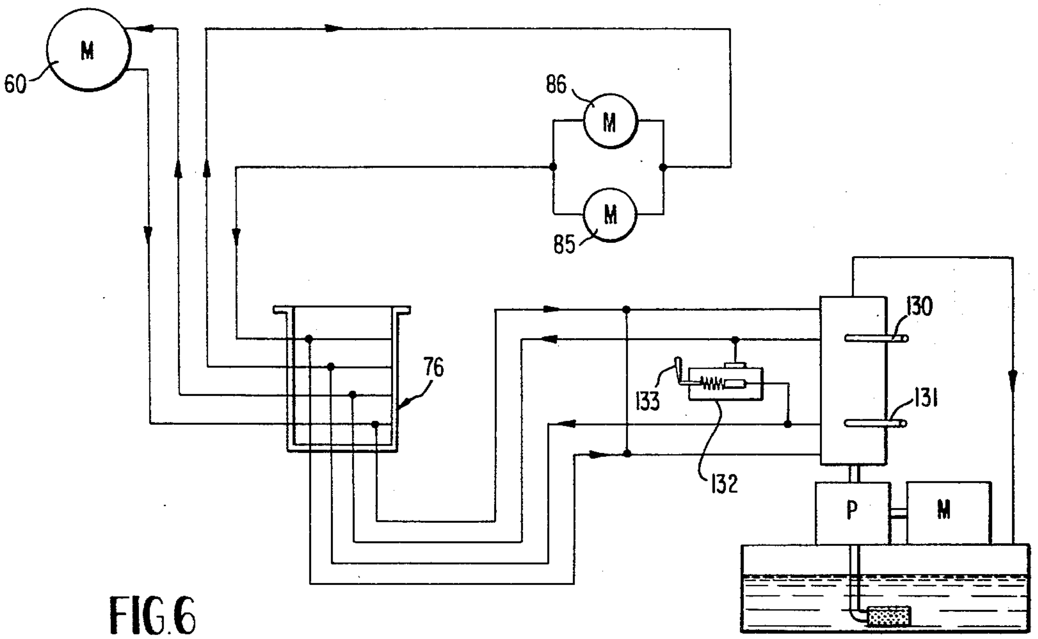
FIG. 6 is a schematic view of the hydraulic system.

As seen in FIG. 6, the hydraulic system includes a manual lever 130 for actuating the sweep motor 60 which enables independent sweep movement of the auger means 30 around the silo without rotation of the auger 33. Reversing the sweep motor 60 enables rocking of the auger means 30 for the purpose of dislodging severely compacted silage. Similarly, manual lever 131 can be independently operated to rotate the auger 33 about its own axis. When fully automatic operation is desired, the spring biased control valve 132 is placed across the supply lines and only the rotation valve 131 is opened. Oil is then delivered to the rotation motors 85 and 86 and through control valve 132 to the sweep motor 60. If the auger becomes overloaded, the oil pressure rises and at a predetermined level set by adjustment handle 133 of the control valve 132, the control valve will close and stop the sweeping movement until the auger has cleared itself sufficiently to produce a reduction in the oil pressure to below the shut-off level. The control valve 132 then opens and sweeping is initiated again. Suitable safety valves may be employed. The control valve 132 may be of the type which not only turns the sweep motor 60 on and off but also slows and speeds up the sweep motor by a regulattion of fluid flow.

Preferably the guide plate 38 is rigidified by a series of spaced narrow braces 125 extending downwardly to the raised trailing edge of the arm 34.

While the invention has been described with reference to certain embodiments, they are to be considered illustrative rather than limiting, and it is intended to cover all further embodiments that fall within the spirit and scope of the appended claims.

We claim:

1. In a silo bottom unloader system for a silo having a cylindrical upright wall and a circular bottom floor with a central opening, an auger means including an auger for delivering silage to said opening and an annularly arranged silage conditioning means for manipulating silage to facilitate downward flow to said auger means; said auger means including rotating means for rotating said auger about its own axis for delivery of silage to said opening, and sweep means for driving said auger about said bottom floor; said silage conditioning means including discrete constricting means above said auger means projecting inwardly from spaced positions around said wall which define a constricted area and which compresses the silage to expand and balloon the silage downwardly, thereby fracturing segments from the mass of silage.

2. In a silo bottom unloader system as defined in claim 1 and wherein said constricting means includes a plurality of mounds.

3. In a silo bottom unloader system as defined in claim 1 and wherein said constricting means includes a plurality of silage fracturing arms, each arm having a top silage engaging surface which extends downwardly and inwardly toward the bottom floor of the silo.

4. In a silo bottom unloader system as defined in claim 3 and including a column forming means extending around the bottom of the silo adjacent said wall for forming an annular column of silage for relieving the force on the outer end of the auger means.

5. In a silo bottom unloader system as defined in claim 4 and including a U-channel circular track at the outer bottom wall of the silo with its top leg and bottom leg extending inwardly, the top leg being said column forming means, a runner slidably positioned within the U-channel and rotatably supporting the outer end of the auger, said runner having a cutter means at its leading edge extending from said top leg to said bottom leg, said auger having blades at its outer end which extend into said U-channel and coact with said cutter means to cut and remove silage from the U-channel and thereby prevent the formation of a compressed wedge of silage ahead of said runner.

6. In a silo bottom unloader system as defined in claim 5 and wherein said top leg of the U-channel has drive holes therethrough, said sweep means including a drive wheel having cone-like teeth meshing upwardly into driving self-clearing engagement with the drive holes.

7. In a silo bottom unloader system as defined in claim 6 and wherein said blades are spaced along said auger and each blade includes a base portion connected to the auger, an intermediate portion having a forward cutting edge, and an outer tip extending toward the outer end of the aguer to produce annular angular cuts in the silage and thereby facilitate downward silage movement.

8. In a silo bottom unloader system for a silo having a cylindrical upright wall and a circular bottom floor with a central opening; a U-channel circular track at the outer bottom wall of the silo with its top leg and bottom leg extending inwardly, the top leg having drive holes therethrough; an auger means including an auger extending between said opening and the track, rotating means rotating said auger about its own axis for delivery of silage to said opening, and sweep means for driving said auger about said bottom floor, a runner slidably positioned within the U-channel and ratatably supporting the outer end of the auger, said runner having a cutter means at its leading edge extending from said top leg to said bottom leg, said auger having blades at its outer end which extend into said U-channel and coact with said cutter means to cut and remove silage from the U-channel and thereby prevent the formaton of a compressed wedge of silage ahead of said runner, said sweep means including a drive wheel having cone-like teeth meshing upwardly into driving self-clearing engagement with the drive holes.

9. In a silo bottom unloader system as defined in claim 8 and wherein said auger means includes an arm along the trailing side of said auger, said arm including a guide plate which curves upwardly around the lower quadrant of the auger and terminates in a vertical portion just above the middle of the auger and below the top of the auger to facilitate overflow of silage and the sweeping movement of the auger means.

10. In a silo bottom unloader system as defined in claim 9 and including a corner shield at the juncture of the guide plate with the runner to prevent build-up of silage, and braces extending diagonally on the top of the guide plate to the trailing bottom portion of the arm.

References Cited

UNITED STATES PATENTS

| | | | |
|---|---|---|---|
| 1,745,716 | 2/1930 | Rynders | 222—459 |
| 2,969,156 | 1/1961 | Miller et al. | 214—17 |
| 2,989,946 | 6/1961 | Singley. | |
| 3,121,501 | 2/1964 | Laidig | 214—17 |
| 3,127,032 | 3/1964 | Roberts | 214—17 |
| 3,208,607 | 9/1965 | Weissmann | 214—17 |
| 3,214,800 | 11/1965 | Froese | 214—17 XR |
| 3,237,788 | 3/1966 | Weaver et al. | 214—17 |

ROBERT G. SHERIDAN, *Primary Examiner.*